United States Patent
Ma

(10) Patent No.: US 11,237,889 B1
(45) Date of Patent: Feb. 1, 2022

(54) APPLICATION INFRASTRUCTURE CONFIGURATION BASED ON ANNOTATED API SCHEMAS

(71) Applicant: salesforce.com, inc., San Francisco, CA (US)

(72) Inventor: Billy Ma, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/144,920

(22) Filed: Jan. 8, 2021

Related U.S. Application Data

(63) Continuation-in-part of application No. 16/991,972, filed on Aug. 12, 2020, now Pat. No. 11,030,082.

(51) Int. Cl.

| | | |
|---|---|---|
| *G06F 9/455* | (2018.01) | |
| *G06F 8/65* | (2018.01) | |
| *G06F 9/54* | (2006.01) | |
| *G06F 16/22* | (2019.01) | |

(52) U.S. Cl.
CPC .............. *G06F 9/548* (2013.01); *G06F 8/65* (2013.01); *G06F 9/45504* (2013.01); *G06F 16/22* (2019.01)

(58) Field of Classification Search
None
See application file for complete search history.

(56) References Cited

U.S. PATENT DOCUMENTS

| | | | | |
|---|---|---|---|---|
| 7,380,235 | B1* | 5/2008 | Fathalla | G06F 11/3664 |
| | | | | 714/E11.207 |
| 9,280,686 | B1* | 3/2016 | Fuller | H04L 67/2804 |
| 9,959,198 | B1* | 5/2018 | Jha | G06F 11/3664 |
| 10,089,219 | B1* | 10/2018 | Bates | G06F 9/451 |
| 2006/0190923 | A1* | 8/2006 | Jubran | G06F 9/44589 |
| | | | | 717/104 |

(Continued)

OTHER PUBLICATIONS

Amazon, "Create a REST API with a mock integration in Amazon API Gateway," Date Unknown, seven pages, [Online] [Retrieved on Dec. 8, 2020] Retrieved from the Internet <URL: https://docs.aws.amazon.com/apigateway/latest/developerguide/apigateway-getting-started-mock.html>.

(Continued)

*Primary Examiner* — Philip Wang
(74) *Attorney, Agent, or Firm* — Fenwick & West LLP

(57) ABSTRACT

An infrastructure management system automatically determines a configuration of infrastructure services for the execution of applications that best satisfies predefined target criteria based on receiving annotated application programming interface (API) schemas associated with the applications. The system extracts information from customized annotations in a received API schema, sets up an API gateway with an existing configuration of infrastructure services, and logs requests received at this existing configuration via the gateway. The system generates a set of alternate configurations based on the extracted information, simulates execution of a set of logged requests to determine a set of valid configurations, and subsequently selects a new configuration that satisfies threshold predefined target criteria. The system may update the existing configuration to the new configuration without interrupting application services.

20 Claims, 6 Drawing Sheets

(56) References Cited

U.S. PATENT DOCUMENTS

| | | | | |
|---|---|---|---|---|
| 2011/0264961 | A1* | 10/2011 | Hong | H04L 43/50 714/38.1 |
| 2011/0307860 | A1* | 12/2011 | Park | G06F 11/3696 717/107 |
| 2017/0300402 | A1* | 10/2017 | Hoffner | G06F 11/3664 |
| 2018/0321918 | A1* | 11/2018 | McClory | H04L 63/0281 |
| 2020/0233787 | A1* | 7/2020 | Battaglia | H04L 63/1433 |
| 2020/0394122 | A1* | 12/2020 | Burde | G06F 11/3692 |
| 2021/0004468 | A1* | 1/2021 | El-Moussa | G06F 21/577 |
| 2021/0233163 | A1* | 7/2021 | Tosmur | G06Q 40/02 |

OTHER PUBLICATIONS

Apollo Docs, "Mocking: Mock your GraphQL data based on a schema," Date Unknown, eight pages, [Online] [Retrieved on Dec. 8, 2020] Retrieved from the Internet <URL: https://www.apolloQraphql.com/docs/apollo-server/testinQ/mockinQ/>.

Apollo Docs, "The Apollo platform: Bring your data graph from prototype to production," Date Unknown, seven pages, [Online] [Retrieved on Dec. 8, 2020] Retrieved from the Internet <URL: https://www.apolloQraphql.com/docs/intro/platform/>.

Mockserver, "MockServer: Easy mocking of any system you integrate with via HTTP or HTTPS," Date Unknown, nine pages, [Online] [Retrieved on Dec. 8, 2020] Retrieved from the Internet <URL: https://www.mock-server.com/>.

Mulesoft, "Simulate API Calls with the Mocking Service," Date Unknown, four pages, [Online] [Retrieved on Decembers, 2020] Retrieved from the Internet <URL: https://docs.mulesofl.com/design-center/design-mocking-service>.

Soapui, "API Mocking: Best Practices & Tips for Getting Started," Date Unknown, five pages, [Online] [Retrieved on Dec. 8, 2020] Retrieved from the Internet <URL: https://www.soapui.om/learn/mockina/what-is-api-mockina/>.

Wiremock, "WireMock: Mock your APIs for fast, robust and comprehensive testing," Date Unknown, three pages, [Online] [Retrieved on December 8, 20201 Retrieved from the Internet <URL: http://wiremock.orq/>.

* cited by examiner

APPLICATION INFRASTRUCTURE CONFIGURATION BASED ON ANNOTATED API SCHEMAS

CROSS REFERENCE TO RELATED APPLICATIONS

This application is a continuation-in-part of co-pending U.S. application Ser. No. 16/991,972, filed Aug. 12, 2020, which is incorporated by reference in its entirety.

BACKGROUND

Field of Art

This disclosure relates in general to establishing configurations of infrastructure services in association with an application, and in particular to the use of annotations in application programming interface (API) schemas to adjust and update configurations of infrastructure services.

Description of the Related Art

Computing environments have become increasingly complex and distributed. A computing system interacts with multiple other systems in a computing environment to perform a computation. For example, a system generating a webpage for providing to a client device may invoke APIs of different services to generate different components of the web page. Application developers want to deliver the best workflow and performance experience to customers using the applications. In order to provide such experience, the developers require that the underlying infrastructure services, such as those available in a cloud-based system, be configured to satisfy specified target criteria, such as desired throughput rate, response time, CPU utilization, memory utilization, etc. Often, this requires developers to spend significant resources in terms of time and effort to learn various infrastructure services, test various configurations with the infrastructure services, and predict CPU and memory utilization as the applications evolve and as adoption of the applications grow. Furthermore, applications services may be slowed or even paused as an existing configuration of services is updated to a new configuration.

However, conventional techniques provide limited support for development and testing of improved configuration of infrastructure services and for ensuring that the application services do not undergo significant interruption.

Figure 1:
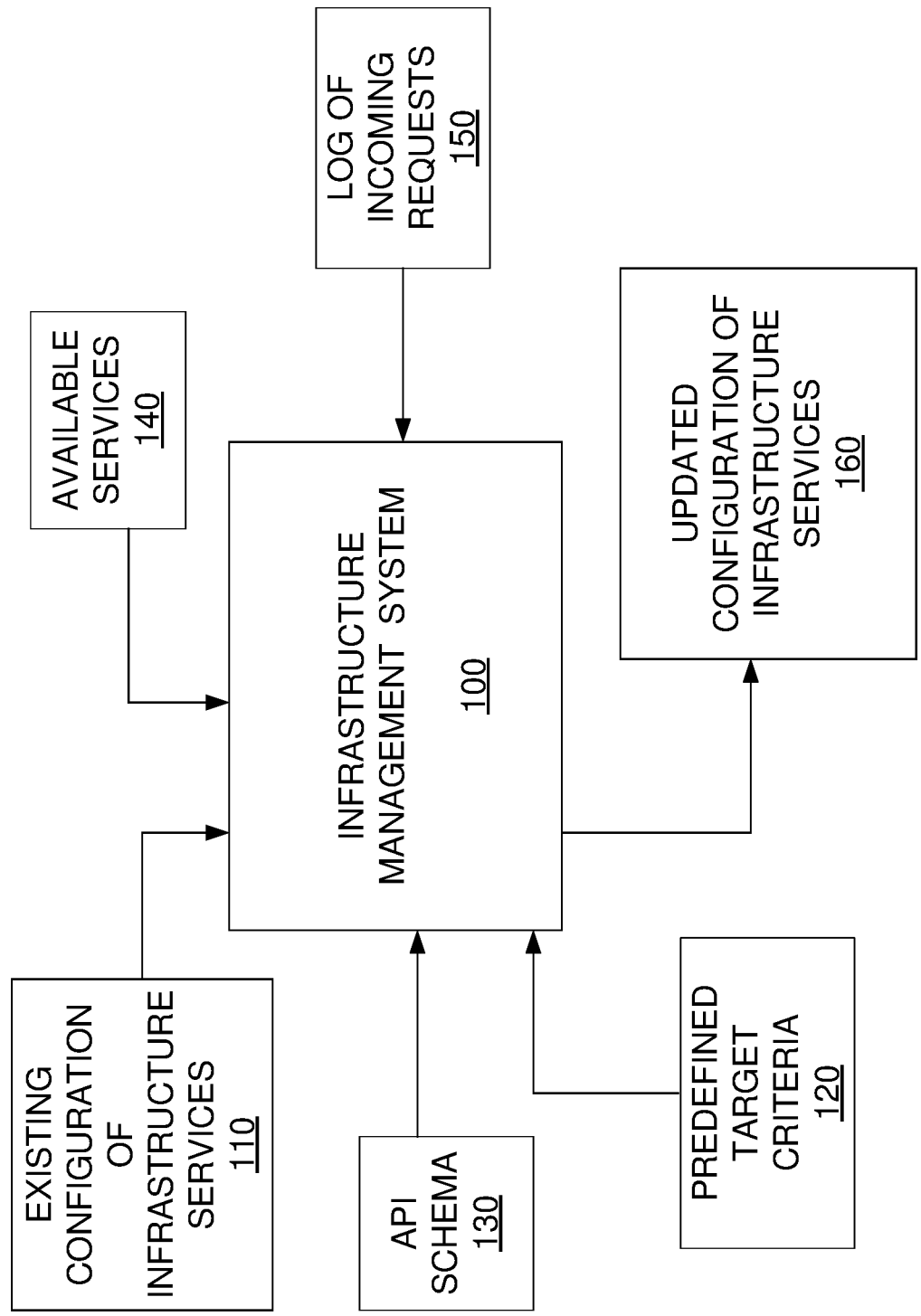
FIG. 1 shows a block diagram illustrating the use of an infrastructure management system, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Application developers want to deliver the best workflow and performance experience to customers using the applications. In order to provide such experience, the developers require that the underlying infrastructure services, such as those available in a cloud-based system, be configured to satisfy specified target criteria, such as desired throughput rate, response time, CPU utilization, memory utilization, etc. Often, this requires developers to spend significant resources in terms of time and effort to learn various infrastructure services, test various configurations with the infrastructure services, and predict CPU and memory utilization as the applications evolve and as adoption of the applications grow.

Embodiments of the infrastructure management system described here automatically determine a configuration of infrastructure services for the execution of applications that best satisfies predefined target criteria based on receiving annotated API schemas associated with the applications. The annotations of a particular API schema provide the infrastructure management system with contextual information that may be used by the infrastructure management system to determine a suitable configuration of infrastructure services in association with a particular API.

Overall System Environment

Software system components may interact with each other via API requests. A component may be a subcomponent of a larger component that can execute independent of other subcomponents and that includes one or more software modules. A component may provide results to other components or may be a service that is invoked by other components. Thus, a component provides APIs for allowing other software components to interact with it. A component interacts with other components by making API requests.

Each component may execute on one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a laptop, desktop, or any device with a display monitor for displaying a user interface, e.g. a personal digital assistant (PDA), mobile telephone, video game system, etc. Each computing device stores software modules storing instructions.

The interactions between the various software components may be performed via a network. In various embodiments, the components interact using a network that uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

An API request may be made by a component over a network from one computing system to another. An API request may be made over the internet, for example, using hypertext protocol (HTTP). An API request may be an invocation of a method within the same computing system that does not require transmitting data over a network. Often, API calls are received at a system via an API gateway, where the system may use a micro-service architecture.

An API gateway is system or a tool that allows a client to interact with a collection of backend services. The API gateway receives application programming interface (API) calls, interfaces with various services, and returns the results based on responses provided by the services. For example, an external system such as an application may send requests for a specific API via an API gateway. The application may be a web application that configures web pages to present to a user via a user interface. Accordingly, the web application invokes different APIs to configure different components of a web page, for example, a shopping cart, a web form, content displayed on the webpage and so on.

In some embodiments, the system components may be developed for a tenant of a multi-tenant system. Embodiments of the infrastructure management system described herein may be provided by the multi-tenant system. Various tenants may provide API schemas to the infrastructure management system for generating optimal configurations of the infrastructure services in association with applications that are run by users of the tenant. A multi-tenant system may store data for one or more tenants. Each tenant may be an enterprise or an organization that represents a customer of the multi-tenant system. Each tenant may have multiple users that interact with the multi-tenant system via client devices. Various elements of hardware and software of the multi-tenant system may be shared by multiple tenants. In an embodiment, an application for whom the infrastructure configuration adjustment is being performed may be a tenant application that accesses data stored in the multi-tenant system, for example, in tables of databases of the multi-tenant system. The application may be developed using tools and services provided by the multi-tenant system. The application may invoke services provided by the multi-tenant system, for example, to configure web pages.

In one embodiment, a multi-tenant system implements a web-based customer relationship management (CRM) system. For example, the multi-tenant system may store applications configured to implement and execute CRM software applications. As an example, one tenant might be a company that employs salespersons that use client devices to manage their sales process. Thus, a user might maintain contact data, leads data, customer follow-up data, performance data, goals and progress data, etc., all applicable to that user's personal sales process.

A multi-tenant system includes a data store that stores data for various tenants of the multi-tenant system. It is transparent to tenants that their data may be stored in a data store that is shared with data of other tenants. The data store may store data for different tenants in separate physical structures, for example, separate database tables or separate databases. Alternatively, the data store may store data of multiple tenants in a shared structure. For example, user accounts for all tenants may share the same database table. However, the multi-tenant system stores additional information to logically separate data of different tenants. Accordingly, data of one tenant is kept logically separate from that of other tenants so that one tenant does not have access to another tenant's data, unless such data is expressly shared.

Since a multi-tenant system may store information for several enterprises or organizations, the multi-tenant system needs a large number of servers running a large number of DBMSs. Each DBMS may be shared across multiple tenants. Accordingly, a multi-tenant system needs to implement policies to relocate DBMSs in case of failover to ensure that the DBMSs have very small downtime.

Infrastructure Management System

FIG. 1 shows a block diagram illustrating the input and output entities in association with the use of an infrastructure management system 100, according to one embodiment. In embodiments described herein, the infrastructure management system 100 receives information about an existing configuration of infrastructure services 110 on which applications are being executed.

The information that is received by the information management system 100 may be in the form of cloud-based services that are currently in use within the existing infrastructure configuration, such as database services, in-memory data stores, etc., along with the routing and communication links between the various infrastructure services. The existing configuration of the infrastructure services may be used to run one or more applications. When a new application or an existing application that invokes new services is to be executed by the existing infrastructure architecture, it may be the case that the developers may specify target criteria 120 that are not met by the existing configuration.

Embodiments of the system 100 receive an API schema 130 that is associated with an application for execution using infrastructure services in conjunction with an API gateway. The API schema 130 received by the infrastructure management system 100 is annotated to provide contextual information to the system regarding the application and required services.

The annotations received by the infrastructure management system 100 through an API schema may provide contextual information regarding the various objects and methods that may be invoked in executing the application. The annotations may also provide information about the various infrastructure services that may be required for execution of the application. Embodiments of the system 100 extract the information from the annotations in the received schema 130 and construct structured data for further use.

The system 100 also receives a catalog of available services 140, such as available databases, database services, in-memory cache services, etc., that may be available for use as part of an updated configuration of infrastructure services. The catalog of available services 140 may also provide information associated with the cost of using the services. Embodiments of the system 100 also receive a log of incoming requests 150 at the existing configuration. The system 100 uses the structured data together with the available services 140, the log of the incoming requests 150 to identify various alternate configurations of the needed infrastructure services.

The system 100 runs simulations of servicing incoming requests using the identified alternate configurations based on a replay of some of the logged incoming requests and selects a suitable configuration of an infrastructure architecture that best satisfies the predefined target criteria 120. Embodiments of the system 100 then perform an automated adjustment of the configuration of infrastructure services by updating the configuration of the infrastructure services to the selected new configuration of the infrastructure services 160. The application associated with the API schema 130 is deployed for execution within the new configuration of the infrastructure services 160.

Figure 4:
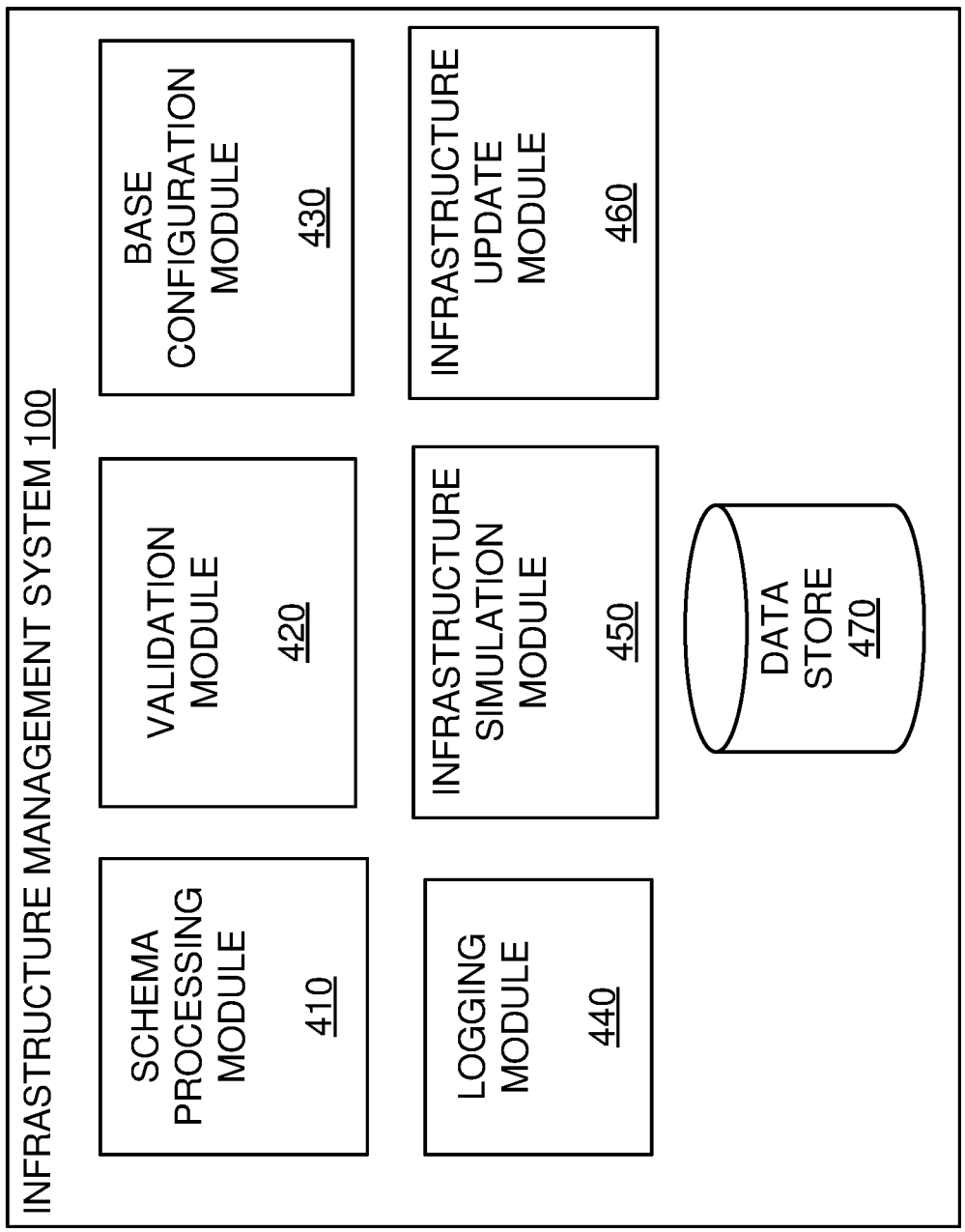
FIG. 4 is a block diagram illustrating components of the infrastructure management system, according to one embodiment.

Details of modules that form the infrastructure management system 100 may be found in FIG. 4 and the associated description. Details about the overall process for performing automated adjustment of the configuration of the infrastructure by the infrastructure management system 100 may be found in FIG. 5 and the associated description.

Figure 2A:
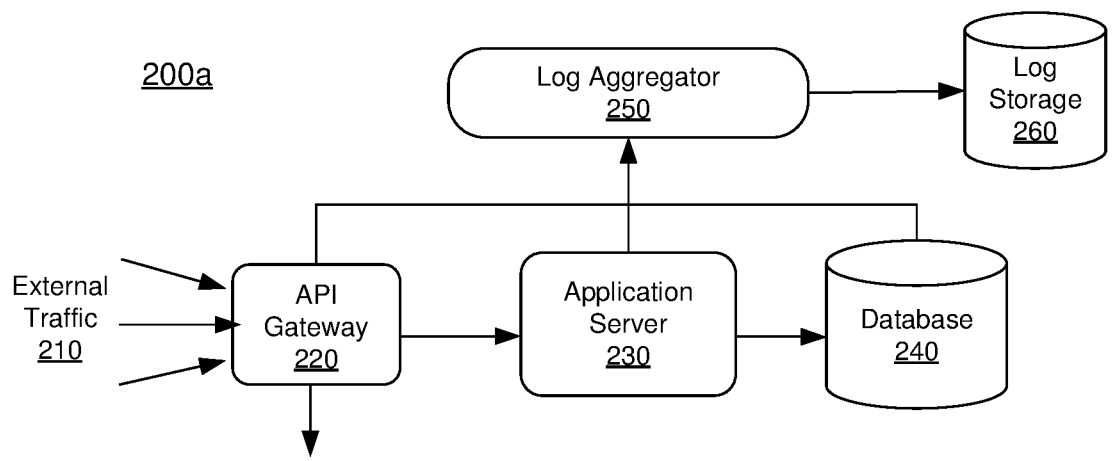
FIG. 2A-2C show three exemplary configurations of infrastructure services that may be configured in association with an API gateway, according to one embodiment.
Figure 2B:
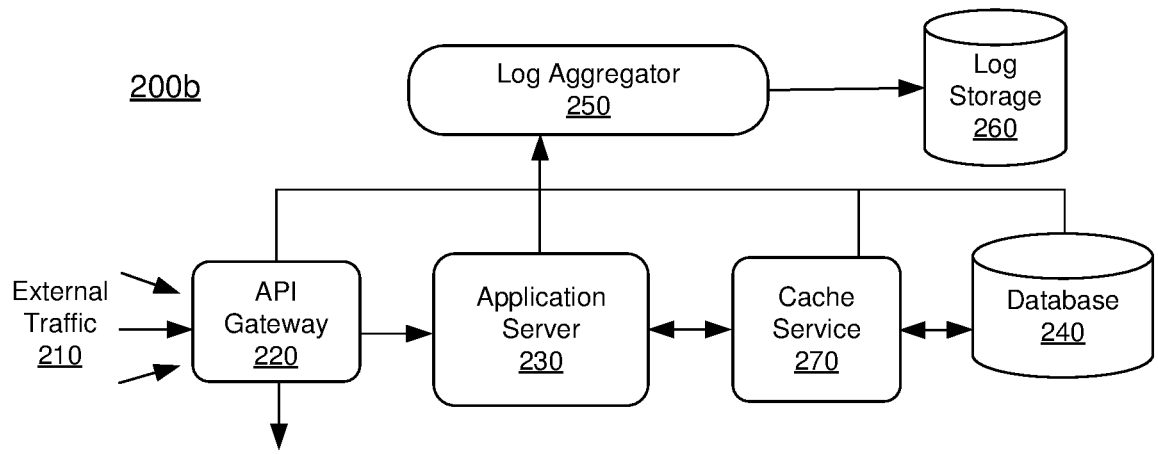
Figure 2C:
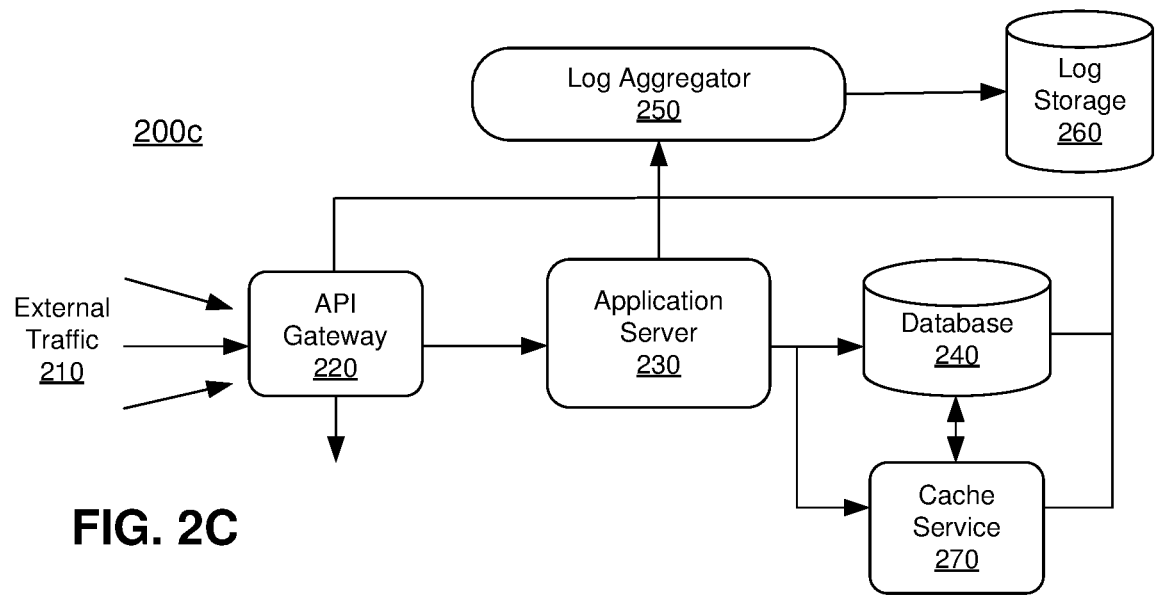

FIG. 2A-2C show three exemplary configurations that may be deployed in association with an API gateway by embodiments of the infrastructure management system 100.

FIG. 2A depicts external traffic 210 arriving at an API gateway 220 that is directed to an application server 230. The application server 230 communicates with a database 250. The API gateway 220, the application server 230, and the database 240 send information about the incoming requests and outgoing responses to the log aggregator 250 which subsequently stores the logged information at the log storage 260. In some embodiments, the infrastructure management system 100 may first deploy a base configuration of infrastructure services 200a for executing an application based on a received API schema. The infrastructure management system 100 may subsequently automatically adjust the configuration from the base configuration 200a and select an alternate configuration based on the annotations in the received API schema, predefined target criteria, a catalog of available services, and the logged information, such as described with respect to FIG. 1.

FIG. 2B depicts an alternate configuration 200b of infrastructure services that may be simulated by the system 100 in association with some of the logged incoming requests to check for performance as specified by the predefined target criteria. In FIG. 2B, based on the received API schema, the system 100 may configure a cache service 270 such that access to data for the application server 230 may only be through the cache service 270. The cache service may access the database 240 according to application functionality and established protocol. Furthermore, the cache service 270 sends information about received requests and responses to the log aggregator 240 for storage at the log storage 260.

FIG. 2C depicts another alternate configuration 200c of infrastructure services that may be simulated by the system 100 in association with some of the logged incoming requests to check for performance as specified by the predefined target criteria. In FIG. 2C, based on the received API schema, the system 100 may configure the cache service 270 such that the application server 230 may access either the cache service 270 or the database 240 for desired data. The cache service may also access the database 240 according to application functionality and established protocol. Furthermore, the cache service 270 sends information about received requests and responses to the log aggregator 240 for storage at the log storage 260.

The infrastructure management system 100 may choose between configurations 200B or 200C based on the results of the simulations with respect to the predefined target criteria. For example, the infrastructure management system 100 may select configuration 200c as the configuration that best satisfied the predefined target criteria. Subsequently the infrastructure management system 100 will update the infrastructure by deploying the new cache service 270, re-route requests appropriately within the infrastructure, and decommission unnecessary services.

Figure 3A:
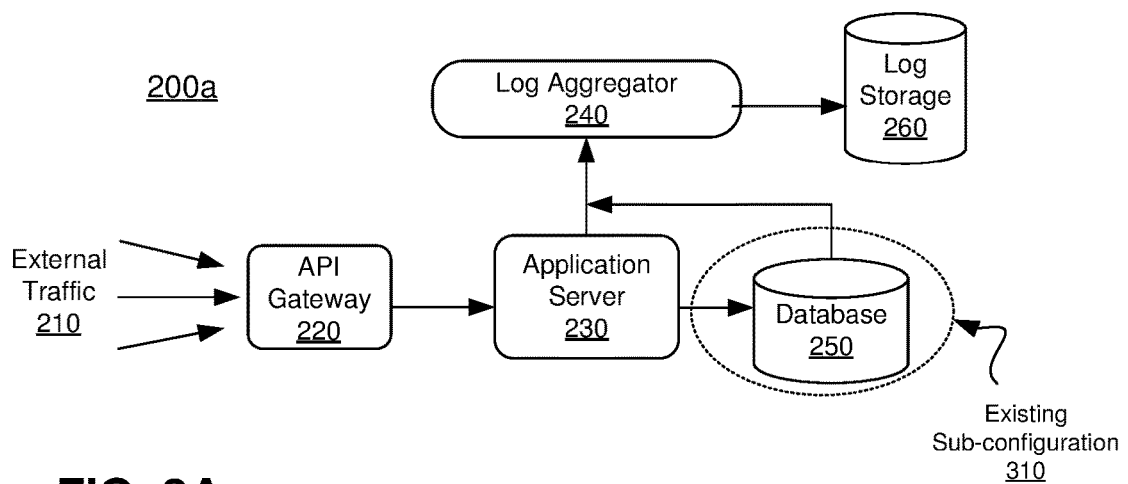
FIG. 3A shows an exemplary existing configuration of infrastructure services in conjunction with an API gateway, according to one embodiment.
Figure 3B:
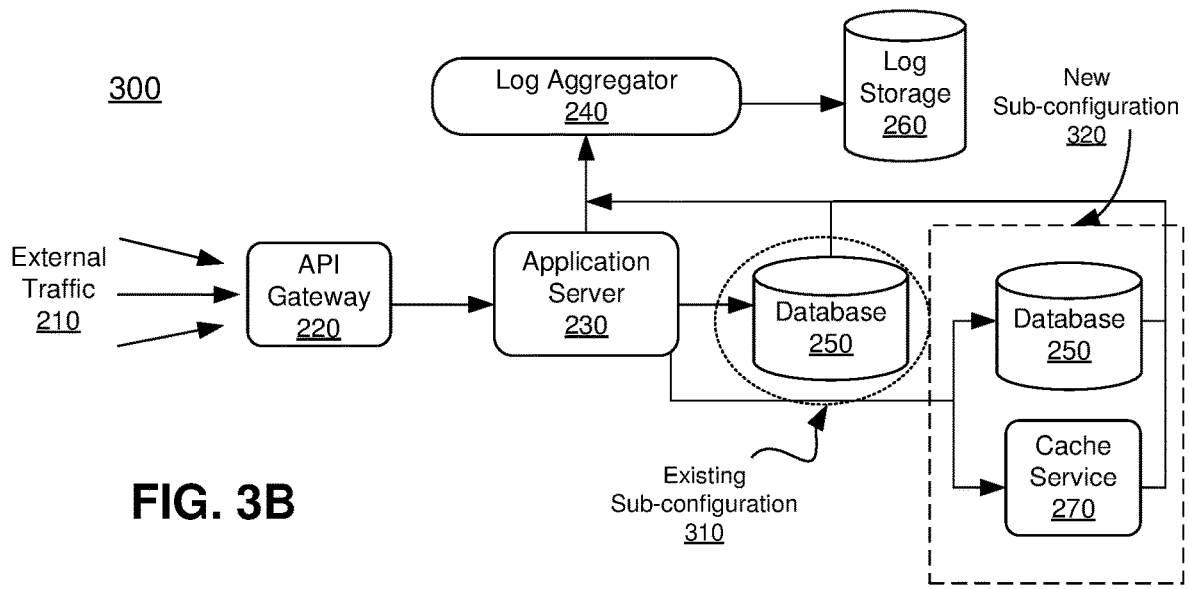
FIG. 3B shows a transition state with an exemplary existing configuration and an exemplary new configuration getting deployed, according to one embodiment.
Figure 3C:
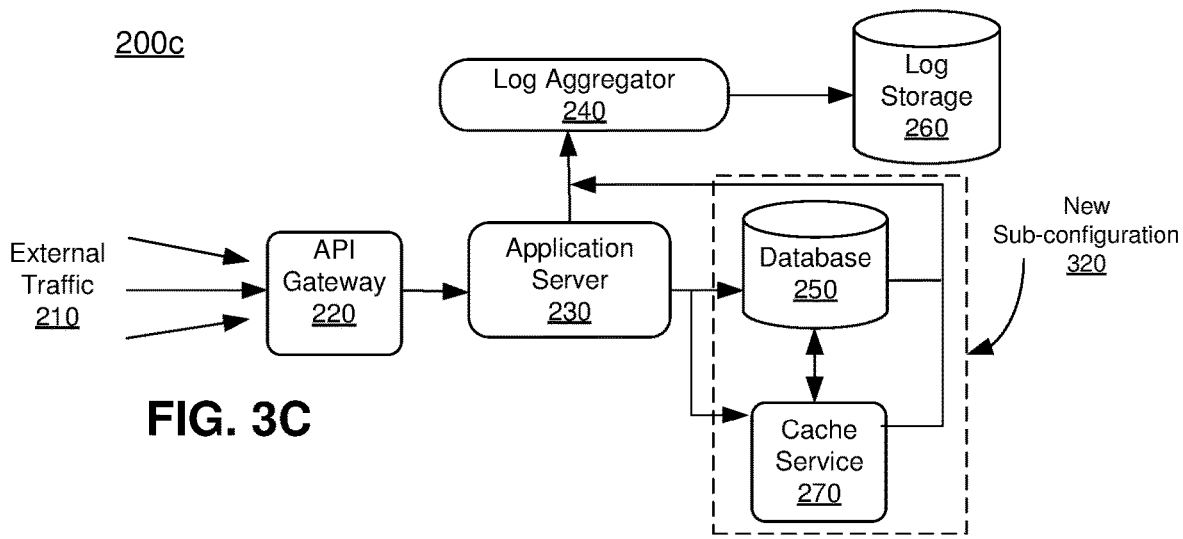
FIG. 3C shows the completed transition state with the exemplary new configuration of infrastructure services in conjunction with the API gateway, according to one embodiment.

FIG. 3A-3C depicts configuration transition as performed by the infrastructure management system 100 in which an exemplary existing configuration 200a depicted in FIG. 3A undergoes a transition in the configuration to an alternate configuration 200c depicted in FIG. 3C, according to an embodiment. FIG. 3B depicts an exemplary transition state of the configuration 300, according to an embodiment.

FIG. 3A depicts the configuration 200a, with an existing sub-configuration 310 involving the database 250. FIG. 3B depicts a transition state of the configuration 300, in which the infrastructure management system may deploy or update the new cache service 270, route new connections to between the database 250, the application server 230, and the cache service 270, and thereby form the new sub-configuration 320, while the existing sub-configuration 310 is also in effect while existing requests are being serviced. Subsequently, the infrastructure management system 100 will remove any old services if needed, or remove any obsolete connections to services, and only the new sub-configuration 320 will be part of the newly configured infrastructure architecture 200c, as depicted in FIG. 3C.

FIG. 4 is a block diagram illustrating components of the infrastructure management system 100, according to one embodiment. The infrastructure management system 100 includes a schema processing module 410, a validation module 420, a base configuration module 430, a logging module 440, an infrastructure simulation module 450, an infrastructure update module 460, and a data store 470. Other embodiments may include more or fewer modules than those shown in FIG. 4. Functionality indicated as being performed by a particular module may be performed by other modules than those indicated herein. Furthermore, steps of any processes described herein can be performed in an order different from that illustrated herein.

The API schema processing module 410 receives and stores API schemas. The module 410 receives an annotated API schema and parses the API schema to extract and assimilate information from the annotations. The information is provided by an API schema is assimilated using data configurations. Each data configuration includes various methods of the API schema, various types of data objects returned by each method, various types of annotations associated with each method, etc. The module 410 may transform the format of the data generated to conform to specific types of APIs. Examples of specific API types include RAML (Restful API Modeling Language), GraphQL query language for specifying APIs, Web Socket API, etc.

In some embodiments, the annotations in a received API schema may limit the values for an attribute to a predefined set that may be specified as a range of values specified using a minimum and a maximum value, as an enumerated set of predefined values, or as the set of values stored in a data store, for example, a column of a database table. The annotations may specify that the set of values is determined using an input parameter of the request, or that the name of a column of a table used for selecting the values of an attribute may be specified as a string value passed in as a parameter of the request.

The API schema processing module 410 may extract and store information from the annotations such as protocol information, request types, query parameters, data type information such as attribute types, ranges of attribute values, operators to be used for determining attribute values, fields that may need indexing based on specified patterns, unique fields, etc., as well as custom annotations. The annotations may be used by the API schema processing module 410 to translate the received API schema to establish limits on generate/read/write/delete operations and error scenarios in association with the data. Some of the annotations may be associated with a set of services. The API schema processing module 410 processes the annotations to extract the information regarding the set of services. The extracted information from the received API schemas may be stored by the API schema processing module 410 in a structured data format such as a table, etc.

The validation module 420 uses the data extracted and stored by the API schema processing module to create information regarding application logic in association with the received API schema. With custom annotations such as "state" and "contextAware" the validation module 420 constructs the application logic. Examples of the use of the "state" and "contextAware" annotations is described below:

The API schema may specify following attributes in a "state" annotation for preserving the state of certain data: (i) a field annotation that identifies a field of the API, (ii) a scope of the context, for example, global context or session context, and (iii) a type of operation, for example, whether the API should update the state in the context, get the state from the context, or delete the state in the context. The operation field may not be specified if the operation can be determined based on the API schema. Following is an example of a state annotation that uses global context for storing a material field.

(state):
    fields: material
    scope: global

The above state annotation may be used in an API that accesses material as follows. Accordingly, a "material" API when invoked, stores the material record obtained in a global context.

/material:
    /{materialId}:
      (state):
        fields: [material]
        scope: global
        displayName: Material Service
        description: Provides information on the requested material
      uriParameters:
        materialId:
          type: string Another example shown below is of a state annotation that uses session context for storing a patron field. Accordingly, a "patron" API when invoked, stores the patron record obtained in a context.

/patron:
    /{patronId}:
      (state):
        fields: [patron]
        scope: session
      uriParameters:
        patronId:
          type: string Similarly, a "contextAware" annotation allows interactions between parameters of the API and fields of records stored in the context. The contextAware annotation specifies the following attributes: (i) a targetField attribute that specifies the response fields that use data stored in the context and (ii) a targetArgument attribute that specifies the arguments in the request that affect the data generation process. The validation module 420 also supports different types of "behavior" for contextAware annotation. A behavior attribute determines the type of constraints following by the data generation process, for example, mirror, mirrorunique, and unique. A mirror behavior specifies that the validation module 420 should directly copy the value from the request, session or global context. A mirrorunique behavior specifies that the validation module 420 should copy back values from request, session or global contexts but ensure that the values are unique. A unique behavior specifies that the validation module 420 should ensure that all values in the response are unique. The contextAware annotation may specify the operation if the operation cannot be determined based on the schema, for example, update, delete, get.

(contextAware):
    targetField: [String]
    operation: [update, delete, get]
    behavior: [mirror, mirrorunique, unique . . . ]
    scope: [request, session, global]
    targetArgument: [String]

Following is an example of a reserve API that uses a contextAware annotation to update material.condition field of a material record in the context to the value of reserve.status in the global context.

/reserve:
    /{materialId}/{patronId}:
      (contextAware):
      targetField: material.condition
      operation: update
      behavior: mirror
      scope: global
      targetArgument: reserve.status
      uriParameters:
      materialId:
      type: string
      patronId:
      type: string The application logic may be in the form of constraints on the data. The validation module 420 ensures that each API request is checked in view of constraints specified by the API schema. Examples of constraints may include format of the data, constraints on the values, etc.

The base configuration module 430 generates a base configuration of the infrastructure services to process requests received at an API gateway when an API schema is received. In some embodiments, with the extracted protocol information, the system 100 incorporates the required protocol service (e.g., GraphQL™, Rest™, etc.) and sets up the appropriate API gateway. In some embodiments, the base configuration of the infrastructure services may include services such as a database server, an application server, a log aggregator, and a log storage. An example configuration of the infrastructure services may be as depicted in FIG. 2A. Such a configuration may be considered a minimal configuration for handling incoming requests and logging information for automated configuration adjustment of the infrastructure services. Some embodiments may have other base configurations of the infrastructure services so long as the base configuration is able to handle incoming requests and log information for automated configuration purposes.

The logging module 440 logs runtime statistical information for each received request at the API gateway. For each request that is processed, the logging module 440 may log information associated with the request itself, such as: request identifier, request uniform resource locator (url), total request processing time, input data, output data, input data size, output data size, wait time, and timestamp information. The logging module 440 may log information that is associated with the application server, such as: request identifier, CPU time, memory utilization information, file I/O information, request time, and time stamp. The module 440 may also log information associated with the database server, such as: request identifier, CPU time, number of rows scanned, file I/O, request time, and timestamp.

The logging module 440 flushes the log information after each request is processed to the log aggregator. The logging module 440 ensures that several metrics are generated and preserved for each service for a fixed duration in memory, and that other information may be preserved in a log storage for a configurable prespecified duration, such as a week, or 30 days, etc. The following metrics that may be generated and preserved: throughputs/minute (number of requests served/number of incoming requests), average CPU utilization/minute, average memory utilization/minute, and average requests processed/minute, etc. The statistical information that is gathered from the request level logged data, the application server level logged data and the database server level logged data is stored in the log store in the form of structured data.

The infrastructure simulation module 450 runs simulations on a number of alternate configurations of infrastructure services to produce possible valid configurations of infrastructure services. The alternate configurations of infrastructure services are first generated by the infrastructure simulation module 450 based on the extracted information from the annotated API schema and based on the available services from an available services catalog. In some embodiments the available services catalog also has the infrastructure cost for the available services, i.e., the cost to run the application based on the provided annotations in the API schema. The infrastructure simulation module 450 runs simulated replays of the logged requests (which were received and executed on the existing configuration, that may be the base configuration) on the generated alternate configurations of infrastructure services to generate a set of valid alternate configurations of infrastructure services. A valid alternate configuration is defined as an alternate configuration of infrastructure services that produces identical responses as the responses on the existing (or base) configuration when the infrastructure simulation module 450 replays via simulation, a small set of the logged requests on the configuration. From the valid alternate configurations that are determined from the simulations, the infrastructure simulation module 450 identifies a new configuration that meets at least a threshold level of specified target criteria 120. The predefined target criteria may be any combination of performance criteria such as: lowest request time, the lowest infrastructure cost, or maximized throughput ratio, the shortest time to complete a particular executing process, number of calls to external APIs or services and any associated fees, minimal number of state changes, etc. The predefined target criteria being satisfied in a new configuration may also include any combination of criteria such as: licensing agreements, such as number of hosts available with the services, security assessment, such as the use of selected libraries, and service agreements, such as the specified use of only selected services by a customer, etc.

The infrastructure update module 460 updates the configuration of the infrastructure services from an existing configuration to the new configuration that has been identified by the infrastructure simulation module 450 as the configuration that meets at least a threshold level of predefined target criteria 120. The infrastructure update module deploys any newly identified or updated infrastructure services, and routes requests within the infrastructure services appropriately. The infrastructure update module 460 also decommissions any infrastructure services that are deemed obsolete in the new configuration.

The infrastructure update module 460 may follow an exemplary sequence of operations including (i) deploying or updating any required infrastructure leaf services first, (ii) route any new corresponding request to the newly deployed or updated leaf services, (iii) when obsolete services need to be removed, the infrastructure update module 460 first waits for existing request to complete getting services before decommissioning the obsolete services, and repeat steps (i)-(iii) for each new infrastructure services that need to be redeployed. The module 460 performs the configuration update without any interruption of service from the application server.

The data store 470 receives and stores API schemas. The data store 470 may also store the structured data that is generated by the schema processing module 410 from the annotations in the API schemas. The data store 470 is a memory, such as a read only memory (ROM), dynamic random-access memory (DRAM), static random-access memory (SRAM), or some combination thereof.

In some embodiments, the various modules of the infrastructure management system 100 may pass various data values directly to each other. In some embodiments, the various modules may store data values in the data store 470 and retrieve data values as needed from the data store 470.

Overall Process

Figure 5:
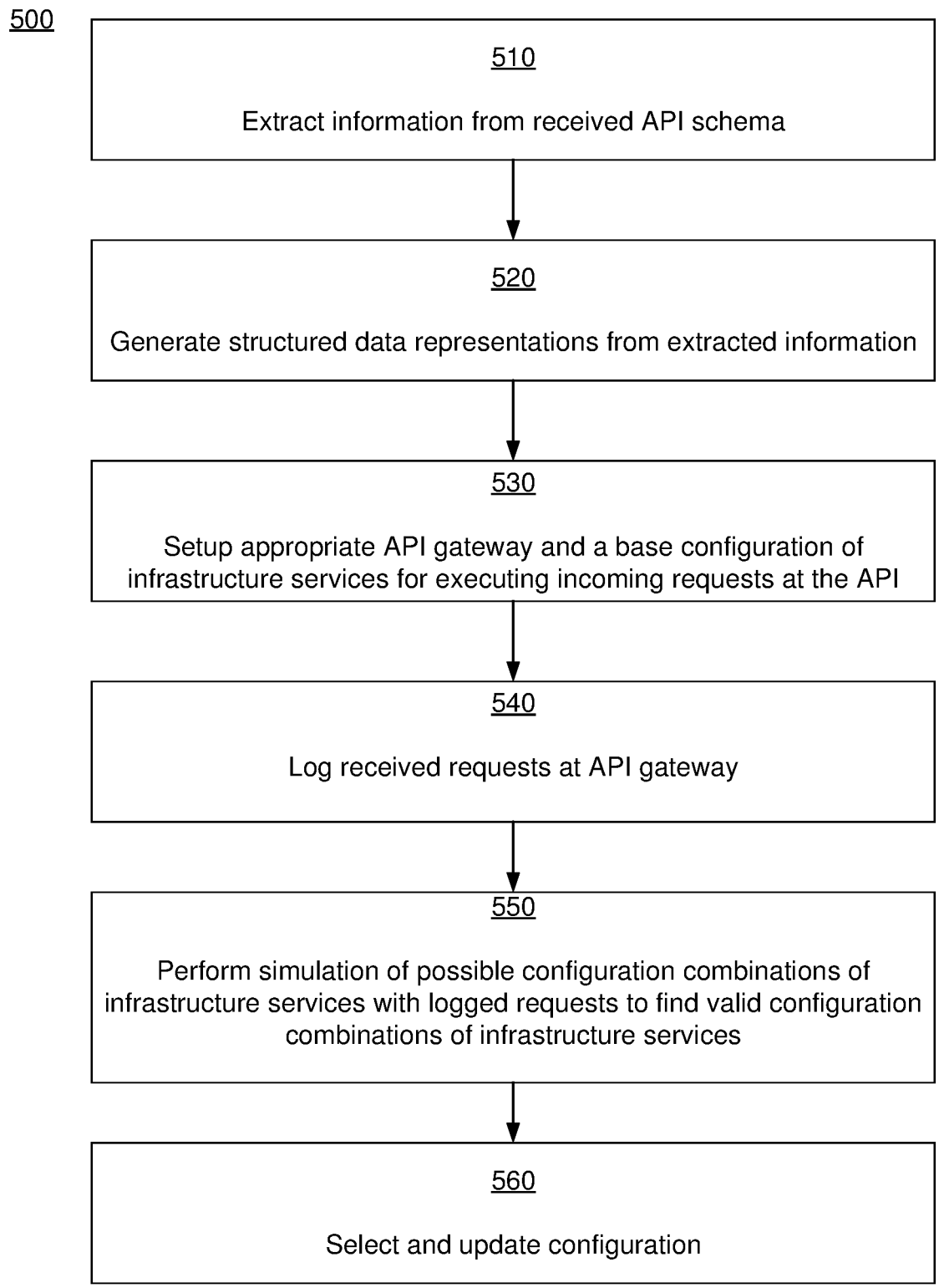
FIG. 5 is a flow chart illustrating the overall process for performing automated adjustment of a configuration of infrastructure services, according to one embodiment.

FIG. 5 is a flow chart illustrating the overall process for automated configuration of infrastructure services as performed by the infrastructure management system 100, according to one embodiment. Various embodiments can perform the steps of FIG. 5 in different orders than those indicated herein. Moreover, other embodiments can include different and/or additional steps than the ones described herein.

The infrastructure management system 100 receives an annotated API schema. The system 100 parses the API schema and extracts 510 information from the annotated schema. The system may extract information from the annotations such as the set of services that will need to be used by the application, as well as protocol information, request types, query parameters, data type related information such as attribute types, ranges of attribute values, operators to be used for determining attribute values, fields that may need indexing based on specified patterns, unique fields, etc., as well as custom annotations.

The system 100 assimilates the extracted information by generating 520 structured data representations based on the extracted information. The system processes the data types, query parameters, and custom annotations for creating the column types, the required indices, the view, etc., of the structured data representation. The structured data representation may be in the form of records stored as tables, or any other suitable format.

The system 100 uses extracted protocol information from the annotated API schema to incorporate the require protocol services and to set up 530 an appropriate API gateway. Furthermore, the system 100 sets up 530 a base configuration of the infrastructure services to process requests received at an API gateway. In some embodiments, the base configuration of the infrastructure services may include services such as a database server, an application server, a log aggregator, and a log storage.

The system 100 logs 540 the runtime statistical information associated with the received request at the API gateway. The system 100 may log 540 information associated with the request itself, such as: request identifier, request uniform resource locator (url), total request time, input data, output data, input data size, output data size, wait time, and timestamp information. The system may log 540 information that is associated with the application server, such as: request identifier, CPU time, memory utilization information, file I/O information, request time, and time stamp. The system 100 may also log 540 information associated with the database server, such as: request identifier, CPU time, number of rows scanned, file I/O, request time, and timestamp. The system 100 may also store the logged information for a configurable prespecified duration in memory.

The system 100 performs simulations 550 on a variety of possible configurations of infrastructure services to produce possible valid service configurations. A valid service configuration is defined as a configuration of infrastructure services that produces identical responses when the system 100 replays via simulation, a small set of the logged requests on the configuration.

From the valid configurations that are determined from the simulations, the system 100 selects 560 a configuration that meets at least a threshold level of predefined target criteria. The predefined target criteria may be any of the lowest request time, the lowest infrastructure cost, or maximized throughput ratio, etc., among other criteria. The system 100 then updates 560 the configuration of the infrastructure services from an existing configuration to the selected configuration by deploying any newly identified or updated infrastructure services, and routing requests within the infrastructure services appropriately. The system 100 also decommissions any infrastructure services that are deemed obsolete in the new configuration. The system 100 performs the configuration update without any interruption of service from the application server.

API Schema Example

The infrastructure management system 100 can be used for various types of applications. Following is an example library application that supports APIs to check patron data, reserve items in the library, and so on. Various types of objects are processed by the APIs, for example, a material object representing material that can be reserved in the library, a patron object describing patrons, and a checkout object representing checkout information such as date and fine, and a reserve object representing reservation information, etc. Examples are described below.

A material object represents library material that is checked out. The material object has a materialId identifier. The API schema uses the following structure to define a materialId. The annotation "(context): dataType: entityId options: domains: [Material]" specifies that the data type of a materialId is of a predefined type entityId. The annotation specifies a domain "Material" for the values of entityId. Accordingly, the infrastructure management system 100 generates values for materialId that are limited to values obtained from a column of a database table. In some embodiments, the system generates an identifier with two parts: (1) a prefix that allows users to quickly identify the object represented by a particular row and (2) a unique pattern that represents a unique identifier. For example, an entityId with "Material" may generate a value that includes the two parts such as "MAT-" representing the prefix concatenated with a 6-digit unique identifier.

```
material:
    displayName: Material
    description: Material available in the library
    properties:
        id:
            type: string
            (context):
                dataType: entityId
                options:
                    domains: [Material]
        name:
            type: string
        condition:
            enum: [Available, Checked Out,
Loaned to Other Library, Hold, Reserved]
        available:
            type: boolean
            (context):
                condition:
                    operator: equal
                    relativeTo: condition
                    value: Available
        costToReplace:
            type: number
            (context):
                dataType: money
                options:
                    maxMoney: 10000
                    minMoney: 1
        'type':
            enum: [Book, Media]
```

The infrastructure management system 100 extracts the annotated information from the material object in the API schema and may store the information as a material record, for example, as the following table:

| Field Name | Field Type | Required | Other Information |
|---|---|---|---|
| Id | String | TRUE | {dataType: entityId, options: {domains: [Material]}} |
| Name | String | TRUE | |
| Condition | Enum | TRUE | {values: ["Available", "Checked Out", "Loaned to Other Library", "Hold", "Reserved"]} |
| Available | Boolean | TRUE | {dataType: boolean, condition: {operator: equal, relativeTo: condition, value: Available}} |
| CostToReplace | Number | TRUE | {dataType: money, options: {maxMoney: 10000, minMoney: 1}} |
| Type | Enum | TRUE | {values: ["Book", "Medial"]} |

Following is the schema for a patron record. The patron record includes attributes including a name of the patron, an id of the patron, and a history of the material checked out by the patron. The attribute history is a collection of various records, each record describing an action performed by the patron with the library.

```
patron:
    displayName: Patron
    description: Patron Information
    properties:
        name:
```

```
                type: string
                (context):
                    dataType: personName
            dues:
                type: number
                (context):
                    dataType: money
                    options:
                        maxMoney: 10000
                        minMoney: 0
                    condition:
                        operator: sum
                        relativeTo: history.fine
            id:
                type: string
                (context):
                    dataType: entityId
                    options:
                        domains: [Patron]
            history:
                type: array
                items: checkout
```

The infrastructure management system 100 extracts the annotated information from the patron object in the API schema and may store the information as a patron record, for example, as the following table:

| Field Name | Field Type | Required | Other Information |
|---|---|---|---|
| Name | String | TRUE | {dataType: personName} |
| Dues | Number | TRUE | {dataType: money, options: {maxMoney: 10000, minMoney, 0}, condition: {sum: historyfine}} |
| Id | String | TRUE | {dataType: entityId, options: {domains: [Patron]}} |
| History | Array<Checkout> | TRUE | |

An item that is checked out has a due date. The API schema specifies the following annotations indicating to the infrastructure management system 100 that any generated value used as dueDate type must be a date in the past. The annotation "after: checkoutDate" specifies that the value of dueDate must occur after a checkoutDate value. The field checkout Date represents the date a library patron checked out a library material and is an attribute of a checked-out record. A checked-out record has attributes including a material ID, a patron ID, a checkout date, a due date, a return date, and fine imposed.

```
checkout:
    displayName: Patron Checkout Record
    description: Contains checkout information such as date
        and fine
    properties:
        materialId:
            type: string
            (context):
                dataType: entityId
                options:
                    domains: [Material]
        patronId:
            type: string
            (context):
                dataType: entityId
                options:
                    domains: [Patron]
        checkoutDate:
            type: datetime
            (context):
                dataType: pastDate
        dueDate:
            type: datetime
            (context):
                dataType: pastDate
                condition:
                    operation: after
                    relativeTo: checkoutDate
        returnDate?:
            type: datetime
            (context):
                dataType: pastDate
                condition:
                    operation: after
                    relativeTo: checkoutDate
        fine:
            type: number
            (context):
                dataType: money
                options:
                    maxMoney: 100
                    minMoney: 0
```

The infrastructure management system 100 extracts the annotated information from the checkout object in the API schema and may store the information as a checkout record, for example, as the following table:

| Field Name | Field Type | Required Other | Information |
|---|---|---|---|
| MaterialId | String | TRUE | {dataType: entityId, options: {domains: [Material]}} |
| PatronId | String | TRUE | {dataType: entityId, options: {domains: [Patron]}} |
| CheckoutDate | Datetime | TRUE | {dataType: pastDate} |
| DueDate | Datetime | TRUE | {dataType: pastDate, condition: {after: checkoutDate}} |
| ReturnDate | Datetime | FALSE | {dataType: pastDate, condition: {after: checkoutDate}} |
| Fine | Number | TRUE | {dataType: money, options: {maxMoney: 100, minMoney: 0}} |

A reserve record may be constructed for reserving a material by a patron using defined annotations in the API schema as follows:

```
reserve:
    displayName: Reservation information
    description: Reservation information for a material
    properties:
        materialId:
            type: string
            (context):
                dataType: entityId
                options:
                    domains: [Material]
        patronId:
            type: string
            (context):
                dataType: entityId
                options:
                    domains: [Patron]
        startDate:
            type: datetime
            (context):
                dataType: futureDate
        endDate:
            type: datetime
            (context):
                dataType: futureDate
                condition:
```

```
            operator: after
              relativeTo: startDate
          reserved:
            type: boolean
            (context):
              condition:
                operator: equal
                relativeTo: material.available
                value: 'Reserved'
```

The infrastructure management system 100 extracts the annotated information from the checkout object in the API schema and may store the information as a checkout record, for example, as the following table:

| Field Name | Field Type | Reqd. | Other Information |
|---|---|---|---|
| MaterialId | String | TRUE | {dataType: entityId, options: {domains: [Material]}} |
| PatronId | String | TRUE | {dataType: entityId, options: {domains: [Patron]}} |
| StartDate | Date time | TRUE | {dataType: futureDate} |
| EndDate | Date time | TRUE | {dataType: futureDate, condition: {after: startDate}} |
| Reserved | Boolean | TRUE | {condition: {operator: mirror, relativeTo: material., available value: "Reserved"}} |

Following is an example of a API schema for a "material" request that allows an application to retrieve information regarding a material in the library.

```
material:
  /{materialId}:
    (fieldMapping):
      field: materialId
      target: material.id
    displayName: Material Service
    description: Provides information on the requested material
    uriParameters:
      materialId:
        type: string
    get:
      responses:
        200:
          description: 'Success response'
          body:
            type: material
        400:
          description: 'Incorrect Material Id'
          body:
            properties:
              message: string
```

Following is an example of portion of API schema for a "patron" request that allows an application to retrieve information describing a patron of the library. The information describing the patron includes material of the library that is checked out by the patron.

```
/patron:
  /{patronId}:
    (fieldMapping):
      field: patronId
      target: patron.id
    displayName: Patron Service
    description: Provides information on the request patron
```

```
    uriParameters:
      patronId:
        type: string
    get:
      responses:
        200:
          (postProcess):
            'type': sort
            target: checkout.checkoutDate
          description: 'Success response'
          body:
            type: patron
        400:
          description: 'Incorrect Patron Id'
          body:
            properties:
              message: string
```

Following is an example of portion of API schema for a "reserve" request that allows an application to reserve a material in the library for a patron of the library.

```
/reserve:
  /{materialId}/{patronId}:
    (fieldMapping):
      field: materialId
      target: reserve.materialId
    (fieldMapping):
      field: patronId
      target: reserve.patronId
    displayName: Reserve Service
    description: Reserve a material for a particular patron
    uriParameters:
      materialId:
        type: string
      patronId:
        type: string
    post:
      (condition)
        target: material.status
        operation: equal
        value: 'Available'
      responses:
        200:
          (contextAware):
            target: material.status
            operation: update
            behavior: mirror
            value: 'Reserved'
          description: 'Success response'
          body:
            type: reserve
        400:
          description: 'Incorrect Material Id or Patron Id'
          body:
            properties:
              message: string
```

The infrastructure management system 100 may identify that the fields "Id" need indexing based on the following hints derived from the API schema annotations:

| Entity | Field | Hint |
|---|---|---|
| Material | Id | EntityId DataType, Query Parameters, Relation Declaration |
| Patron | Id | EntityId DataType, Query Parameters, Relation Declaration |
| Checkout | CheckoutDate | Annotation - sort operation |

The infrastructure management system 100 may identify that the unique fields "Id" based on EntityId declarations derived from the API schema annotations:

| Entity | Field |
|---|---|
| Material | Id |
| Patron | Id |

Based on the object declarations in the API schemas, the infrastructure management system 100 create information regarding application logic in association with the received API schema. The application logic may be in the form of constraints on the data. For example, the following validations may be generated by the infrastructure management system 100 based on the "material," "patron," "checkout," and "reserve" object declarations and associated annotations

| Material: | |
|---|---|
| Field Name | Validation |
| Id | In the format of MAT-\d{6} |
| Condition | Only the following values are valid: "Available", "Checked Out", "Loaned to Other Library", "Hold", "Reserved" |
| Available CostToReplace | Amount between $1.00 to $10,000.00 |
| Type | Only the following values are valid: "Book", "Media" |

| Patron: | |
|---|---|
| Field Name | Validation |
| Name | Salutation, First, Middle, Last, and Suffix fields |
| Due | |
| Id | In the format of PAT-\d{6} |
| History | |

| Checkout | |
|---|---|
| Field Name | Validation |
| MaterialId | In the format of MAT-\d{6} |
| PatronId | In the format of PAT-\d{6} |
| CheckoutDate | DateTime in the past |
| DueDate | Value must be after CheckoutDate |
| ReturnDate | Value must be after CheckoutDate |
| Fine | Amount between $0 to $100.00 |

| Reserve: | |
|---|---|
| Field Name | Validation |
| MaterialId | In the format of MAT-\d{6} |
| PatronId | In the format of PAT-\d{6} |
| StartDate | DateTime in the future |
| EndDate | Value must be after StartDate |
| Reserved | |

Based on the request declarations, the infrastructure management system 100 creates validations on each request, for example: Request: GET: /material/{materialId}
Validation: Material table contains row with Id matching materialId Request: GET: /patron/{patronId}
Validation: Patron table contains row with Id matching patronId Request: POST: /reserve/{materialId}/{patronId}
Validation: Material table contains row with Id matching materialId
Validation: Patron table contains row with Id matching patronId
Validation: condition Annotation checks Material.status=='Available'
The contextAware annotation updates the Material.status to Reserved:
(contextAware):
  target: material.status
  operation: update
  value: 'Reserved'
Following is an example of a service catalog of services that may be retrieved by the infrastructure management system 100:

| Database type | Service | Cost |
|---|---|---|
| Relational | Dbase service 1 | Transfer: { . . . }, Storage: { . . . }, . . . |
| Relational | Dbase service 2 | Transfer: { . . . }, Storage: { . . . }, . . . |
| Relational | Dbase service 3 | Transfer: { . . . }, Storage: { . . . }, . . . |
| Key-value | Dbase service 4 | Transfer: { . . . }, Storage: { . . . }, . . . |
| In-memory | Cache service 1 | Transfer: { . . . }, Storage: { . . . }, . . . |
| In-memory | Cache service 2 | Transfer: { . . . }, Storage: { . . . }, . . . |
| Document | Document database service 1 | Transfer: { . . . }, Storage: { . . . }, . . . |
| Graph | Graph database service 1 | Transfer: { . . . }, Storage: { . . . }, . . . |

The infrastructure management system 100 logs runtime statistical information for each received request at the API gateway. Examples of logged information for the library application are shown below:
{requestId: '123456789',
timestamp: 20201210112612.5938540,
system: 'database', cpu: 236788080, memory: 6009890, . . . }
{requestId: '123456789',
timestamp: 20201210112612.5913540,
system: 'application', cpu: 456788080, memory: 8009890, . . . }
{requestId: '123456789', path:
'/material/{materialId}', method: 'GET',
input: {data: {materialId: 'MAT-000001'}, size: 1235678},
output: {data: . . . , size: . . . }, timestamp: 20201210112612.5911540
system: 'gateway', . . . }
{requestId: '567891234',
timestamp: 20201210112613.5938540,
system: 'database', cpu: 236787880, memory: 6001890, . . . }
{requestId: '567891234',
timestamp: 20201210112613.5913540,
system: 'application', cpu: 456733580, memory: 8001890, . . . }
{requestId: '567891234', path:
'/material/{materialId}', method: 'GET',
input: {data: {materialId: 'MAT-000002'}, size: 1237878},
output: {data: . . . , size: . . . }, timestamp: 20201210112613.5911540
system: 'gateway', . . . }
{requestId: '254789632',
timestamp: 20201210117625.5913540,
system: 'database', cpu: 236787880, memory: 6001890, . . . }

{requestId: '254789632', timestamp: 20201210117630.5913540, system: 'database', cpu: 256787880, memory: 6013890, . . . }
{requestId: '254789632', timestamp: 20201210119630.5913540, system: 'database', cpu: 256790880, memory: 6013390, . . . }
{requestId: '254789632', timestamp: 20201210117613.5913540, system: 'application', . . . }
{requestId: '254789632', path: '/reserve/{materialId}/{patronId}', method: 'POST', input: {data: {materialId: 'MAT-000002', patronId: 'PAT-000001'}, size: 3257878}, output: {data: . . . , size: . . . }, timestamp: 20201210117613.5911540 system: 'gateway', . . . }

The system 100 may transform the log and the annotated schema into structured data, for example, as the following table:

Database Service Level Data:

| Timestamp | Req. Id | Op. | Table | Input | I/P Bytes | Output | Output Byes | CPU | Memory | Req. Time |
|---|---|---|---|---|---|---|---|---|---|---|
| 20201210112612.5938540 | 12345678 9 | Query | Material | Id | 123467 | * | 35790135 | 236788 080 | 6009890 | 100 |
| 20201210112613.5938540 | 56789123 4 | Query | Material | Id | 123467 | * | 63801021 | 236787 880 | 6001890 | 102 |
| 20201210117625.5913540 | 25478963 2 | Query | Material | Id | 123467 | Status | 45398 | 236787 880 | 6001890 | 99 |
| 20201210117630.5913540 | 25478963 2 | Query | Patron | Id | 123467 | Status | 57895 | 256787 880 | 6013890 | 110 |
| 20201210119630.5913540 | 25478963 2 | Update | Material | Status | 345677 | | 0 | 256790 880 | 6013390 | 130 |

Application Service Level Data:

| Timestamp | Req. Id | Op. | CPU | Memory | Req. Time | Input | Input Bytes | Output | Output Bytes |
|---|---|---|---|---|---|---|---|---|---|
| 20201210112612.5913540 | 12345678 9 | GET | 4567 8808 0 | 800 989 0 | 150 | . . . | . . . | . . . | . . . |
| 20201210112613.5913540 | 56789123 4 | GET | 4567 3358 0 | 600 189 0 | 160 | . . . | . . . | . . . | . . . |
| 20201210117613.5913540 | 25478963 2 | POST | 4237 3358 0 | 750 989 0 | 330 | . . . | . . . | . . . | . . . |

Request Level Data : GET: /material/{materialId}

| Timestamp | Request Id | Services | Operation | Input | Input Bytes | Output | Output Bytes | CPU | Memory | Request Time |
|---|---|---|---|---|---|---|---|---|---|---|
| 20201210112612.5913540 | 12345678 9 | Application | GET | - - - | - - - | - - - | - - - | 4567 8808 0 | 800 989 0 | 150 |
| 20201210112612.5938540 | 12345678 9 | Database | Query | Id | 123467 | * | 357 901 35 | 2367 8808 0 | 600 989 0 | 100 |
| 20201210112613.5913540 | 56789123 4 | Application | GET | - - - | - - - | - - - | - - - | 4567 3358 0 | 600 189 0 | 160 |
| 20201210112613.5938540 | 56789123 4 | Database | Query | Id | 123467 | * | 638 010 21 | 2367 8788 0 | 600 189 0 | 102 |

| Request Level Data: POST: /reserve /{materialId}/{patronId} | | | | | | | | | | |
|---|---|---|---|---|---|---|---|---|---|---|
| Timestamp | Request Id | Services | Operation | Input | Input Bytes | Output | Output Bytes | CPU | Memory | Request Time |
| 202012101 17613.5913 540 | 2547 8963 2 | Application | POST | - - - | - - - | - - - | - - - | 4237 3358 0 | 750 989 0 | 330 |
| 202012101 17625.5913 540 | 2547 8963 2 | Database | Query | Id | 123 467 | Status | 453 98 | 2367 8788 0 | 600 189 0 | 99 |
| 202012101 17630.5913 540 | 2547 8963 2 | Database | Query | Id | 123 467 | Status | 578 95 | 2567 8788 0 | 601 389 0 | 110 |
| 202012101 19630.5913 540 | 2547 8963 2 | Database | Update | Status | 345 677 | | 0 | 2567 9088 0 | 601 339 0 | 130 |

These are example values. Other examples can include different values, fields, and APIs. These examples illustrate how the annotations in API schemas as well as logged request to the API may be used by the infrastructure management system 100 to extract and store data and then used along with a services catalog to determine an updated configuration that meets a threshold level of predefined target criteria.

Computer Architecture

Figure 6:
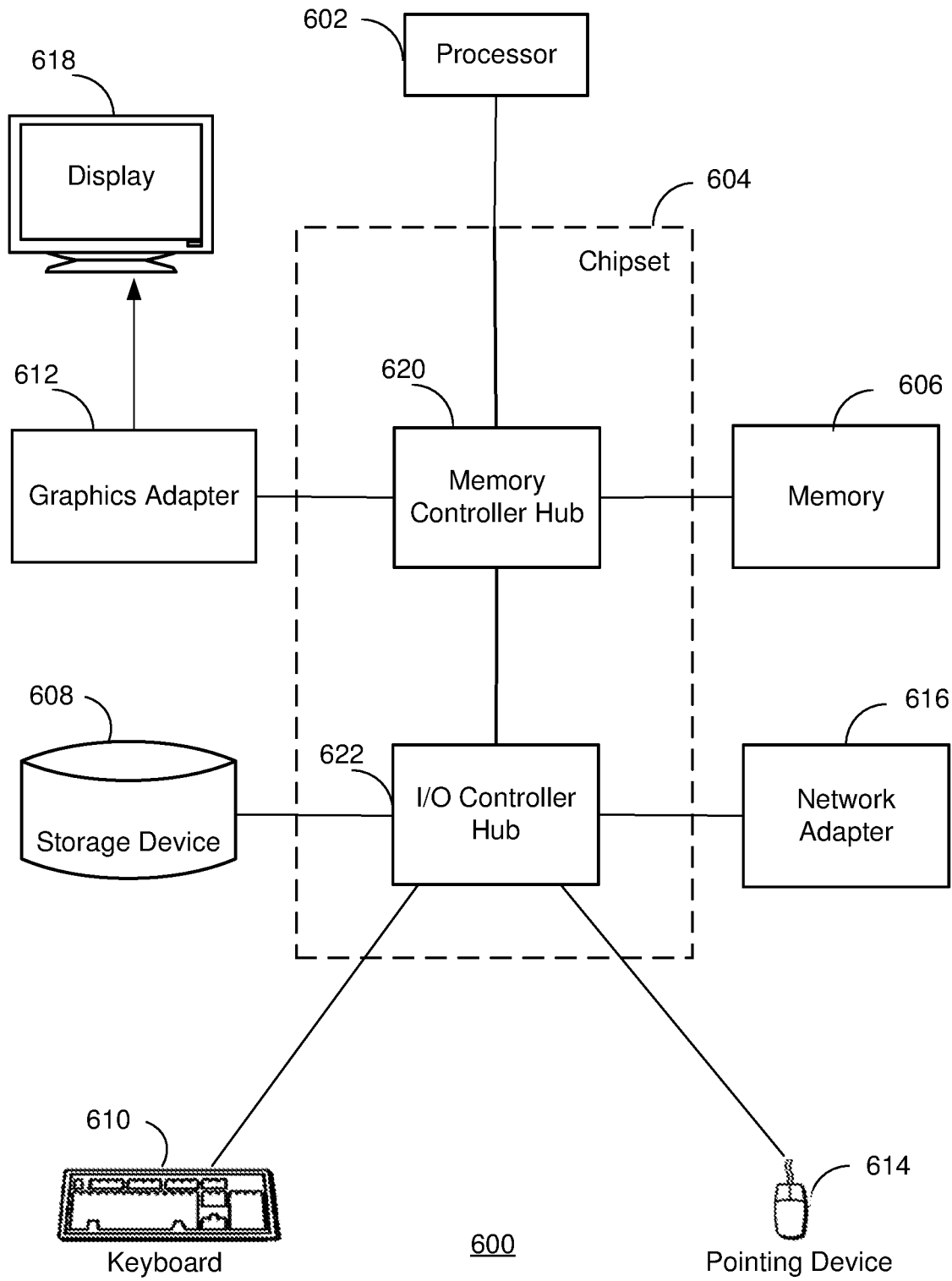
FIG. 6 is a block diagram illustrating the architecture of a typical computer system for use in the environment of FIG. 1 according to one embodiment.

FIG. 6 is a block diagram illustrating the architecture of a typical computer system for use in the environment of FIG. 1 according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the system 100. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 acting as a system 100 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 can vary depending upon the embodiment and the processing power used by the entity. For example, a client device may be a mobile phone with limited processing power, a small display 618, and may lack a pointing device 614. The online system 110 in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

I claim:

1. A computer implemented method for automated configuration of infrastructure services, the method comprising:
   receiving an application programming interface (API) schema of an application, wherein the API schema comprises one or more customized annotations;
   extracting information from the received API schema;
   setting up an API gateway to connect to an existing configuration of infrastructure services, wherein the API gateway is set up based on the extracted information;
   receiving one or more requests for invocation of a method of the API schema at via the API gateway at the existing configuration;
   logging the received requests;
   generating a set of alternate configurations of the infrastructure services based on the extracted information;
   simulating execution of a set of requests from the logged one or more requests on the generated set of alternate configurations of the infrastructure services to generate a set of valid alternate configurations;
   selecting a valid alternate configuration from the set of valid alternate configurations based on the simulated execution and predefined target criteria; and
   deploying the selected valid alternate configuration as a new configuration of infrastructure services in association with the API gateway to process subsequent incoming requests associated with the application.

2. The computer-implemented method of claim 1, wherein the customized annotations provide contextual information regarding at least one of:
   one or more objects that are invoked during execution of the application;
   one or more methods that are invoked during execution of the application; and
   one or more infrastructure services that are required for execution of the application.

3. The computer-implemented method of claim 2, wherein the extracted information is used to generate and store structured data representations of the contextual information.

4. The computer-implemented method of claim 1, wherein the existing configuration comprises at least an application server for processing incoming requests at the API gateway, a database for storing data in association with the application, a log aggregator for logging information regarding the received requests, and a log storage for storing the collected information from the log aggregator.

5. The computer-implemented method of claim 1, wherein logging the received requests comprises collecting runtime statistical information associated with received requests, the collected runtime statistical information comprising at least one of:
   information associated with the received requests;
   information associated with an application server; and
   information associated with a database server.

6. The computer-implemented method of claim 5, wherein the information associated with the received requests comprises at least one of:
   request identifier;
   request uniform resource locator (url);
   total request processing time;
   input data;
   output data;
   input data size;
   output data size;
   wait time; and
   timestamp information.

7. The computer-implemented method of claim 5, wherein the information associated with the application server comprises at least one of:
   request identifier;
   total request processing time;
   CPU time;
   memory utilization;
   file I/O information; and
   timestamp information.

8. The computer-implemented method of claim 5, wherein the information associated with the database server comprises at least one of:
   request identifier;
   total request processing time;
   CPU time;
   number of scanned rows;
   file I/O information; and
   timestamp information.

9. The computer-implemented method of claim 1, wherein each configuration in the set of valid alternate configurations produces responses when a set of the logged received requests is executed on the configuration that are identical to the responses generated when the set of requests were executed on the existing configuration of infrastructure services.

10. The computer-implemented method of claim 1, wherein selecting a valid alternate configuration from the set of valid alternate configurations comprises selecting the valid alternate configuration that satisfies at least threshold values of the predefined target criteria.

11. The computer-implemented method of claim 1, wherein the predefined target criteria are target performance criteria that comprise one or more of: lowest request time, the lowest infrastructure cost, and maximized throughput ratio.

12. The computer-implemented method of claim 1, wherein deploying the selected valid alternate configuration as the new configuration of infrastructure services in association with the API gateway to process subsequent incoming requests associated with the application comprises ensuring that the application services are not interrupted as the configuration is updated from the existing configuration of infrastructure services to the new configuration of infrastructure services.

13. A non-transitory computer readable storage medium for storing instructions that when executed by a computer processor cause the computer processor to perform steps for automated configuration of infrastructure services, the steps comprising:
   receiving an application programming interface (API) schema of an application, wherein the API schema comprises one or more customized annotations;
   extracting information from the received API schema;
   setting up an API gateway to connect to an existing configuration of infrastructure services, wherein the API gateway is set up based on the extracted information;
   receiving one or more requests for invocation of a method of the API schema at the setup API gateway;
   logging the received requests;
   generating a set of alternate configurations of the infrastructure services based on the extracted information;
   simulating execution of a set of requests from the logged one or more requests on the generated set of alternate configurations of the infrastructure services to generate a set of valid alternate configurations;
   selecting a valid alternate configuration from the set of valid alternate configurations based on the simulated execution and predefined target criteria; and
   deploying the selected valid alternate configuration as a new configuration of infrastructure services in association with the API gateway to process subsequent incoming requests associated with the application.

14. The non-transitory computer readable storage medium of claim 13, wherein the customized annotations provide contextual information regarding at least one of:
   one or more objects that are invoked during execution of the application;
   one or more methods that are invoked during execution of the application; and
   one or more infrastructure services that are required for execution of the application.

15. The non-transitory computer readable storage medium of claim 14, wherein the extracted information is used to generate and store structured data representations of the contextual information.

16. The non-transitory computer readable storage medium of claim 13, wherein the existing configuration comprises at least an application server for processing incoming requests at the API gateway, a database for storing data in association with the application, a log aggregator for logging information regarding the received requests, and a log storage for storing the collected information from the log aggregator.

17. The non-transitory computer readable storage medium of claim 13, wherein logging the received requests comprises collecting runtime statistical information associated with received requests, the collected runtime statistical information comprising at least one of:
   information associated with the received requests;
   information associated with an application server; and
   information associated with a database server.

18. The non-transitory computer readable storage medium of claim 13, wherein selecting a valid alternate configuration from the set of valid alternate configurations comprises selecting the valid alternate configuration that satisfies at least threshold values of the predefined target criteria, wherein the predefined target criteria are target performance criteria that comprise one or more of: lowest request time, the lowest infrastructure cost, and maximized throughput ratio.

19. The non-transitory computer readable storage medium of claim 13, wherein deploying the selected valid alternate configuration as the new configuration of infrastructure services in association with the API gateway to process subsequent incoming requests associated with the application comprises ensuring that the application services are not interrupted as the configuration is updated from the existing configuration of infrastructure services to the new configuration of infrastructure services.

20. A computer system comprising:
   a computer processor; and
   a non-transitory computer readable storage medium for storing instructions that when executed by a computer processor cause the computer processor to perform steps for automated configuration of infrastructure services, the steps comprising:
   receiving an application programming interface (API) schema of an application, wherein the API schema comprises one or more customized annotations;
   extracting information from the received API schema;
   setting up an API gateway to connect to an existing configuration of infrastructure services, wherein the API gateway is set up based on the extracted information;
   receiving one or more requests for invocation of a method of the API schema at the setup API gateway;
   logging the received requests;
   generating a set of alternate configurations of the infrastructure services based on the extracted information;
   simulating execution of a set of requests from the logged one or more requests on the generated set of alternate configurations of the infrastructure services to generate a set of valid alternate configurations;
   selecting a valid alternate configuration from the set of valid alternate configurations based on the simulated execution and predefined target criteria; and
   deploying the selected valid alternate configuration as a new configuration of infrastructure services in association with the API gateway to process subsequent incoming requests associated with the application.

* * * * *